United States Patent
Duffield et al.

(10) Patent No.: US 8,392,416 B2
(45) Date of Patent: Mar. 5, 2013

(54) DYNAMIC GROUP CREATION OR RECONFIGURATION BASED UPON AVAILABLE METADATA

(75) Inventors: Dana M. Duffield, Rochester, MN (US); Matthew G. Kelm, Rochester, MN (US); Mark J. Luchini, Rochester, MN (US); Kevin W. Sutter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 11/737,789

(22) Filed: Apr. 20, 2007

(65) Prior Publication Data

US 2008/0263076 A1 Oct. 23, 2008

(51) Int. Cl.
*G06F 17/30* (2006.01)
(52) U.S. Cl. ......................... 707/737; 707/770
(58) Field of Classification Search .................. None
See application file for complete search history.

(56) References Cited

U.S. PATENT DOCUMENTS

| 6,909,910 | B2* | 6/2005 | Pappalardo et al. | 455/558 |
| 7,272,604 | B1* | 9/2007 | Hedloy | 707/770 |
| 7,774,711 | B2* | 8/2010 | Valeski | 715/752 |
| 7,839,987 | B1* | 11/2010 | Kirchhoff et al. | 379/142.02 |
| 2005/0027716 | A1* | 2/2005 | Apfel | 707/100 |
| 2006/0195422 | A1* | 8/2006 | Cadiz et al. | 707/3 |
| 2006/0218225 | A1* | 9/2006 | Hee Voon et al. | 709/201 |
| 2007/0038931 | A1* | 2/2007 | Allaire et al. | 715/526 |

OTHER PUBLICATIONS

Chun-Fai Law etc, "Smart Instant Messenger in Pervasive Computing Environments," Department of Computer Science, The University of Hong Kong.
"Dynamic Instant Messaging Indexing for Groups," http://www.priorartdatabase.com/IPCOM/000137807/.
"Configuring Instant Messaging to Use LDAP Dynamic Groups," http://docs.sun.com/app/doc/819-2503/6n4po7r3u?a=view.

* cited by examiner

*Primary Examiner* — Neveen Abel Jalil
*Assistant Examiner* — Kellye Buckingham
(74) *Attorney, Agent, or Firm* — Cantor Colburn LLP

(57) ABSTRACT

The present invention relates to a method for the dynamic creation or reconfiguration of a contact group listing based upon retrieved metadata. The method comprising identifying a contact that is to be added to a primary contact list, the primary contact list being configured to be accessed by at least one sub-list group, wherein sub-list groups are associated with predetermined metadata classification criteria. The method further comprises interrogating data sources in order to identify metadata that is associated with the contact, and retrieving from the data sources all metadata that has been associated with the contact. The retrieved metadata is subsequently utilized to dynamically generate or reconfigure sub-list groupings in accordance with the information that is retrieved from the metadata.

21 Claims, 3 Drawing Sheets

US 8,392,416 B2

DYNAMIC GROUP CREATION OR RECONFIGURATION BASED UPON AVAILABLE METADATA

BACKGROUND OF THE INVENTION

1. Field of the Invention

This invention relates to the creation of IM contact group lists, and particularly to the dynamic creation and reconfiguration of IM contact group lists based upon retrieved metadata.

2. Description of Background

Instant messaging (IM) systems require the use of an IM client program to facilitate instant messaging service operations wherein individuals are capable of textually communicating in real time. Conventionally, an IM system comprises a network of IM client devices, the IM clients being networked via an IM server or a network of IM servers. A key functional aspect provided by most IM clients is the ability to track and display to a client user the network presence information in regard to individuals that are maintained on an IM client's contact list (frequently referred to as a "buddy list" or "buddy group").

IM client users select contacts (buddies) and assign the contacts to the contact list (buddy list/group). When the contact is online, they are automatically advertised to the IM client as being available for IM communication. Accordingly, when the IM client user is online their presence is also advertised to any contacts on whose list that their contact information resides.

IM client users typically desire up-to-date presence information in regard to the members of their contact list. Thus, accurate presence information is important to IM client users. Current Instant Messaging solutions require the IM user to create groups under which they would like to add/view buddies. If the IM user would like to arrange data hierarchically, current solutions allow the user to create groups and create/move groups into other groups. For individuals who like to view buddies hierarchically this solution requires the IM user to create the hierarchy and if the user changes their mind on how to arrange the hierarchy the changes will all have to be accomplished with manual modification means.

Therefore, there exists a need for a solution that allows an IM user to automatically create contact list groups, and when desired, dynamically change the group/hierarchy that contacts are viewed under.

SUMMARY OF THE INVENTION

The shortcomings of the prior art are overcome and additional advantages are provided through the provision of a method for the dynamic creation or reconfiguration of a contact group listing based upon retrieved metadata. The method comprising identifying a new contact that is to be added to a primary contact list, the primary contact list comprising a plurality of stored contacts, the stored contacts being configured to be accessed by at least one sub-list group, wherein sub-list groups are associated with predetermined metadata classification criteria and determining if a previous entry of the new contact already exists within the primary contact list, wherein if a previous entry of the new contact does not exist within the primary list then the new contact is added to the primary contact list.

The method further comprises interrogating locally and remotely located data sources in order to identify metadata that is associated with the new contact, and retrieving from the locally and remotely located data sources all metadata that has been associated with the new contact, wherein the retrieved metadata is combined into a metadata set.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Within aspects of the present invention IM contact groups are dynamically created or reconfigured based on metadata. The metadata that is utilized is acquired from a plurality of available sources (e.g., an authentication authority/LDAP, an IM authority, an employee directory, etc). Within aspects of the present invention, metadata is structured information regarding data that is associated with a specific contact that is retrieved from a plurality of data sources. The retrieved metadata for a contact is used to dynamically generate possible contact groups and/or contact group hierarchies. The user will now be able to display their stored contacts/buddies groups in a variety of formats.

Within the present invention dynamic grouping and reconfiguration of contacts groups is accomplished by retrieving metadata that has been generated from the combined results of the interrogation of multiple data sources. Further, the dynamically group contact information can be used to further create hierarchical contact group listings, wherein the listings are based upon predetermined metadata categories.

Figure 1:
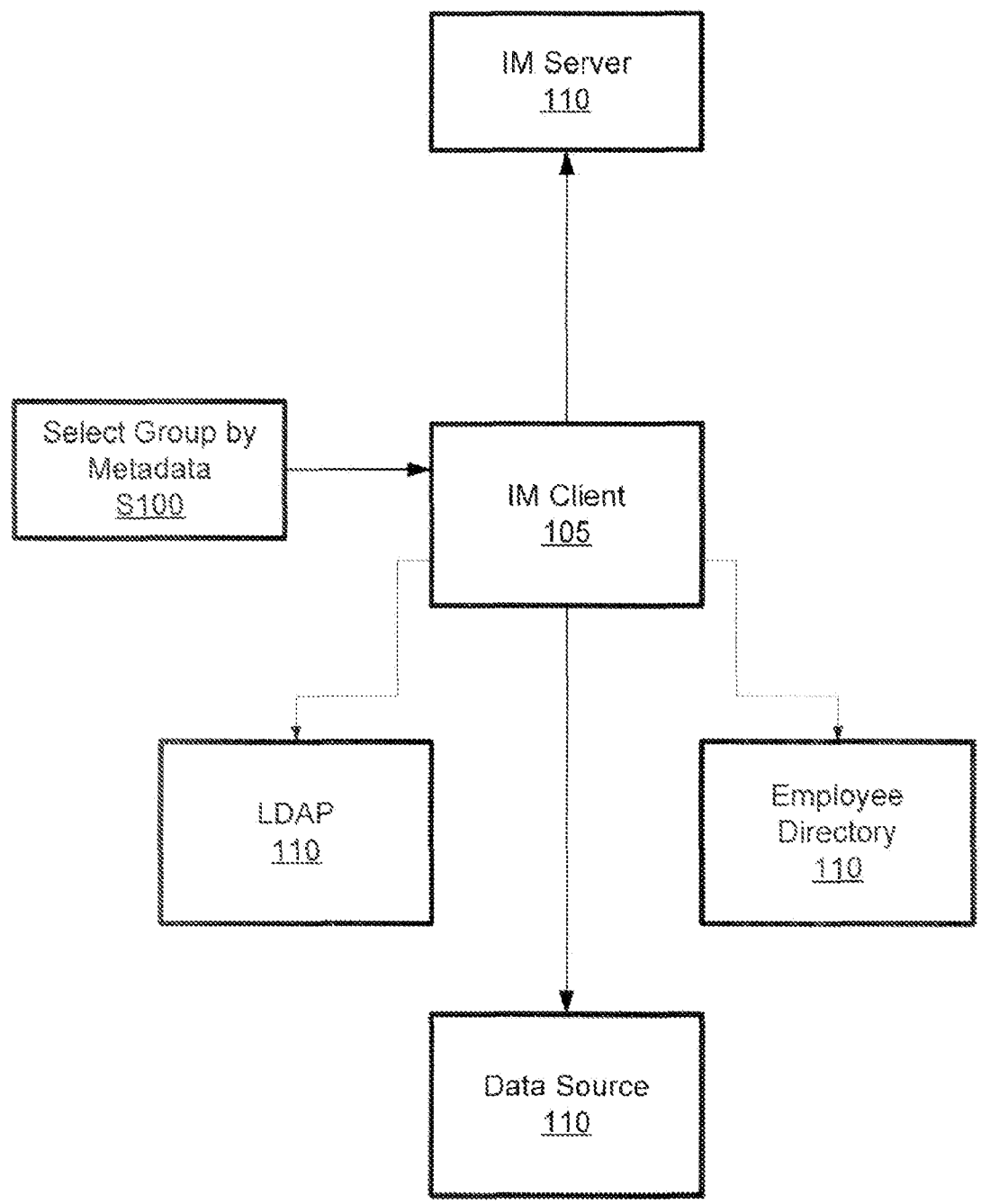
FIG. 1 illustrates one example of an IM client data source interrogator model.

Turning now to the drawings in greater detail, it will be seen that in FIG. 1 there is an example of a system for the creation or reconfiguration of a contact group listing. As seen in FIG. 1, an IM client program user determines 100 the metadata classification criteria that will be used to classify and organize the contacts/buddies that reside in an IM client's buddy list. In the event that the user wants to add a new contact to the IM client's 105 contact list, the IM client 105 will interrogate a plurality of data sources 110 in order to gather metadata that has been associated with the contact from the data sources 110. Once the IM client 105 has identified the sought after contact metadata, the contact metadata information is copied to the IM client 105 The retrieved contact metadata is combined into a metadata set for utilization by the IM client 105 in organizing the classification fields for the primary contact group list.

Figure 2:
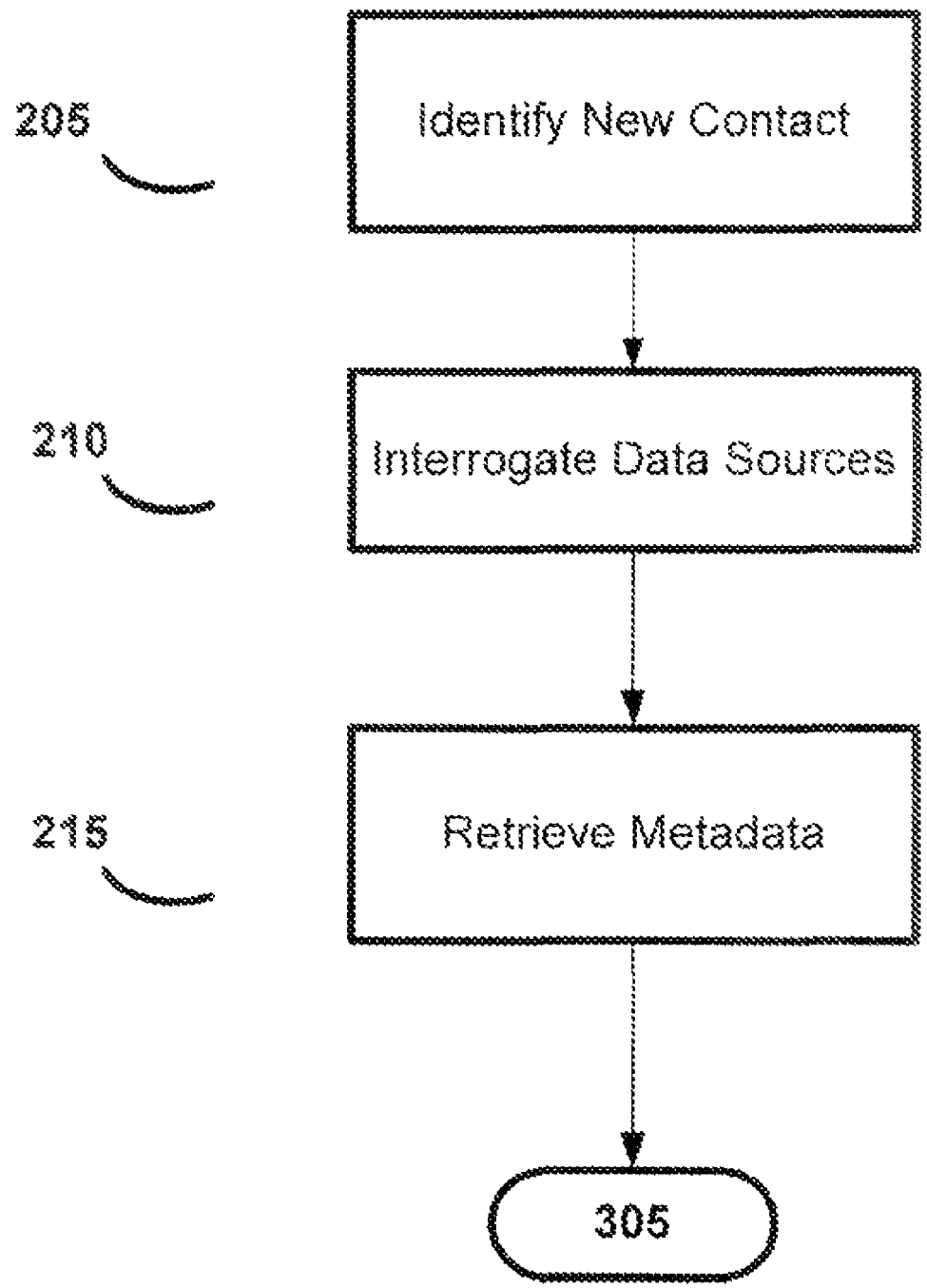
FIGS. 2 and 3 illustrate examples of flow diagrams detailing aspects of a method for the creation or reconfiguration of an IM buddy group.
Figure 3:
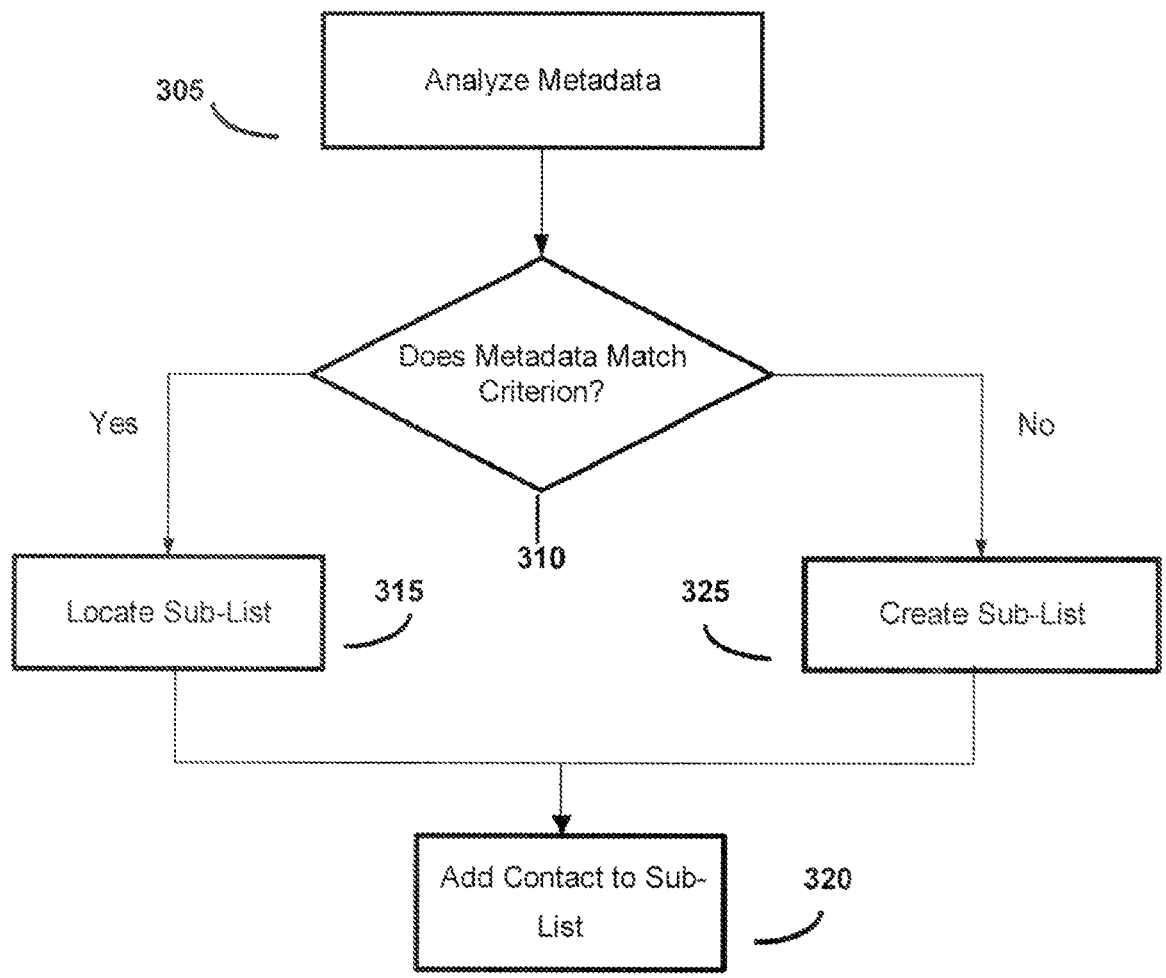

FIGS. 2 and 3 show flow diagrams illustrating a method for the dynamic creation or reconfiguration of a contact group listing based upon retrieved metadata. At step 205, a new contact that is to be added to a primary contact list stored at the IM client 105 is identified. The primary contact list comprises a plurality of stored contacts, wherein the stored contacts are configured for access by at least one sub-list group, the sub-list groups being associated with predetermined metadata classification criteria. A determination is made to ascertain if a previous entry of the new contact already exists within the primary contact list, wherein if a previous entry of the new contact does not exist within the primary list then the new contact is added to the primary contact list.

Next, at step 210, local and remotely located data sources 110 are interrogated by the IM client 105 in order to identify metadata that is associated with the new contact. Last, at step 215 and IM client 105 retrieves from the locally and remotely located data sources 110 all metadata that has been associated with the new contact. The retrieved metadata is combined into a metadata set for utilization by the IM client 105 in order to organize the classification fields for the primary contact list.

Within aspects of the present invention a predetermined metadata classification criterion can be further divided into respective hierarchical sub-classes. For example, in the instance that the metadata classification criterion is set as a geographic location, the hierarchical sub-classes of the classification criterion can hierarchically be further divided into a classification for a state and a city that is located within the geographic area.

At 305, the retrieved metadata is analyzed, where in the event that the metadata that is associated with the new contact matches a predetermined classification criterion (step 310) an attempt is made to locate a sub-list grouping associated with the predetermined metadata classification criterion that matches the retrieved metadata. At step 315, where in the event that the metadata that is associated with the new contact matches a predetermined classification criterion an attempt is made to locate a sub-list grouping associated with the hierarchical sub-classes of the predetermined metadata classification criterion that matches the retrieved metadata. The new contact is associated with a sub-list group in the event that the retrieved metadata that is associated with the new contact matches the classification of the sub-list group (step 320).

At step 325 a new sub-list group is created and the new contact is added to the created sub-list group (step 320) in the event that the retrieved metadata that is associated with the new contact matches a predetermined classification criteria but does not match any existing sub-list group that is associated with the predetermined classification criteria. In the event that new or revised metadata that is associated with a contact is received, the sub-list group that the contact is associated with is evaluated to determine if the contact should be associated with another sub-list group or if a new sub-list group should be generated.

Within further aspects of the present invention multiple sub-list groups can have access to and display a contact entry without the need to have multiple instances of the contact entry exist within each sub-list group. Yet further, displayed views of sub-list groups can be determined according to the preferences of a viewer, the displayed view of the sub-list groups having the capability to be configured to display multiple sub-list groups that are associated with the same primary contact list.

As mentioned above, within aspects of embodiments of the present invention a user is able to view information in a given primary contact list default grouping then dynamically change the view to display another group format, or generate and save a custom grouping hierarchy listing. For example, an IM client user desires to add a new contact kmatt@abcd.com to their primary contact/buddy list. Metadata associated with this contact/buddy is available from a number of data sources. Further, in this instance the user wants new contacts/buddies to be added to the primary contact list under metadata that is equated to the physical location of the contact/buddy.

In this instance, the contact is physically located in Rochester, Minn. Also, the IM client does not currently have a sub-group listing that is associated with the geographic location of Rochester, Minn. Since a group that is associated with metadata referencing Rochester, Minn. was not previously created at the IM client, the IM will create the sub-group Rochester, Minn. and add kmatt@abcd.com to the sub-group contact list.

Over time a user may add additional contacts/buddies that are associated with the location of Rochester, Minn., and would like to view the contacts/buddies in a different sub-group hierarchy. Within aspects of the present invention the user is able to choose the new sub-grouping hierarchy from available metadata. Thus, the user can specify that their displayed view of a contact/buddy list be configured according to differing metadata classification criteria (e.g. by employment division or employment group team). Within aspects of the present invention a single contact/buddy entry can be viewed by a user in a plurality of sub-group listings, thus negating the need to have multiple versions of the same contact/buddy entry exist in the differing sub-group listings. Further, the views of the sub-group listings can be refreshed or changed without having to retrieve the contact information from an IM server.

For example, in the event that a user has contacts/buddies categorized under the classification criterion Rochester, Minn. (information gathered from an IM authority) and sub-grouped by employment group team (information gathered from employee directory). At a later time the user can request that the contact list be displayed in accordance with a locally stored IM client address book (e.g., a group of people the user has in the IM client address book, and group of people that are not stored within the address book), or by time zone, and by country, and finally by team.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed:

1. A method for the dynamic creation or reconfiguration of a contact group listing based upon retrieved metadata, the method comprising:
    identifying a new contact that is to be added to a primary contact list, the primary contact list comprising a plurality of stored contacts, the stored contacts being configured to be accessed by at least one sub-list group, wherein sub-list groups are associated with predetermined metadata classification criteria;
    determining if a previous entry of the new contact already exists within the primary contact list, wherein if a previous entry of the new contact does not exist within the primary list then the new contact is added to the primary contact list;
    based on determining that a previous entry of the new contact does not exist within the primary list:
        interrogating locally and remotely located data sources in order to identify metadata that is associated with the new contact;
        retrieving from the locally and remotely located data sources all metadata that has been associated with the new contact, wherein the retrieved metadata is combined into a combined metadata set; and
        organizing the predetermined metadata classification criteria based on the combined metadata set; and
    based on receiving a new or revised metadata that is associated with a contact, evaluating the sub-list group that the contact is associated with to determine if the contact should be associated with another sub-list group or if a new sub-list group should be generated.

2. The method of claim 1, wherein a predetermined metadata classification criterion is further divided into respective hierarchical sub-classes.

3. The method of claim 2, further comprising analyzing the retrieved metadata, where in the event that the metadata that is associated with the new contact matches a predetermined classification criterion, an attempt is made to locate a sub-list grouping associated with the predetermined metadata classification criterion that matches the retrieved metadata.

4. The method of claim 3, further comprising analyzing the retrieved metadata, where in the event that the metadata that is associated with the new contact matches a predetermined classification criterion an attempt is made to locate a sub-list grouping associated with the hierarchical sub-classes of the predetermined metadata classification criterion that matches the retrieved metadata.

5. The method of claim 4, further comprising associating the new contact with a sub-list group in the event that the retrieved metadata that is associated with the new contact matches the classification of the sub-list group.

6. The method of claim 5, further comprising creating a new sub-list group and adding the new contact to the created sub-list group in the event that the retrieved metadata that is associated with the new contact matches a predetermined classification criteria but does not match any existing sub-list group that is associated with the predetermined classification criteria.

7. The method of claim 6, wherein multiple sub-list groups can have access to and display a contact entry without the need to have multiple instances of the contact entry exist within each sub-list group.

8. The method of claim 7, wherein displayed views of sub-list groups are determined according to the preferences of a viewer, and further, the displayed view of the sub-list groups can be configured to display multiple sub-list groups that are associated with the same primary contact list.

9. A method for the dynamic creation or reconfiguration of a contact group listing of a primary contact list based upon retrieved metadata, the method comprising:
    interrogating locally and remotely located data sources in order to identify metadata that is associated with a new contact, wherein the new contact does not exist in the primary contact list;
    retrieving from the locally and remotely located data sources all metadata that has been associated with the new contact, wherein the retrieved metadata is combined into a combined metadata set;
    analyzing the retrieved metadata;
    organizing predetermined metadata classification criteria associated with sub-list groups of the primary contact list based on the combined metadata set;
    associating the new contact with a sub-list group in the event that the retrieved metadata that is associated with the new contact matches predetermined classification criterion associated with the sub-list group;
    creating a new sub-list group and adding the new contact to the created sub-list group in the event that the retrieved metadata that is associated with the new contact matches the predetermined classification criterion but does not match any existing sub-list group that is associated with the predetermined classification criterion;
    displaying the sub-list group at a display device; and
    based on receiving a new or revised metadata that is associated with a contact, evaluating the sub-list group that the contact is associated with to determine if the contact should be associated with another sub-list group or if a new sub-list group should be generated.

10. The method of claim 9, wherein a predetermined metadata classification criterion is further divided into respective hierarchical sub-classes.

11. The method of claim 10, wherein a sub-list grouping associated is associated with each respective hierarchical sub-class of the predetermined metadata classification criterion.

12. The method of claim 11, wherein multiple sub-list groups can have access to and display a contact entry without the need to have multiple instances of the contact entry exist within each sub-list group.

13. The method of claim 12, wherein displayed views of sub-list groups are determined according to the preferences of a viewer, and further, the displayed view of the sub-list groups can be configured to display multiple sub-list groups that are associated with the same primary contact list.

14. A computer program product including a computer readable medium useable by a processor, the computer readable medium having stored thereon computer readable program code that, when executed by one or more processors, causes the one or more processors to execute a method for the dynamic creation or reconfiguration of a contact group listing based upon retrieved metadata, the method comprising:
    identifying a new contact that is to be added to a primary contact list, the primary contact list comprising a plurality of stored contacts, the stored contacts being configured to be accessed by at least one sub-list group, wherein sub-list groups are associated with predetermined metadata classification criteria;

determining if a previous entry of the new contact already exists within the primary contact list, wherein if a previous entry of the new contact does not exist within the primary list then the new contact is added to the primary contact list;

based on determining that a previous entry of the new contact does not exist within the primary list:

interrogating locally and remotely located data sources in order to identify metadata that is associated with the new contact;

retrieving from the locally and remotely located data sources all metadata that has been associated with the new contact, wherein the retrieved metadata is combined into a combined metadata set; and organizing the predetermined metadata classification criteria based on the combined metadata set; and based on receiving a new or revised metadata that is associated with a contact, evaluating the sub-list group that the contact is associated with to determine if the contact should be associated with another sub-list group or if a new sub-list group should be generated.

15. The computer program product of claim 14, wherein a predetermined metadata classification criterion is further divided into respective hierarchical sub-classes.

16. The computer program product of claim 15, wherein further comprising analyzing the retrieved metadata, where in the event that the metadata that is associated with the new contact matches a predetermined classification criteria, an attempt is made to locate a sub-list grouping associated with the predetermined metadata classification criteria that matches the retrieved metadata.

17. The computer program product of claim 16, further comprising analyzing the retrieved metadata, where in the event that the metadata that is associated with the new contact matches a predetermined classification criterion an attempt is made to locate a sub-list grouping associated with the hierarchical sub-classes of the predetermined metadata classification criterion that matches the retrieved metadata.

18. The computer program product of claim 17, further comprising associating the new contact with a sub-list group in the event that the retrieved metadata that is associated with the new contact matches the classification of the sub-list group.

19. The computer program product of claim 18, further comprising creating a new sub-list group and adding the new contact to the created sub-list group in the event that the retrieved metadata that is associated with the new contact matches a predetermined classification criteria but does not match any existing sub-list group that is associated with the predetermined classification criteria.

20. The computer program product of claim 18, wherein multiple sub-list groups can have access to and display a contact entry without the need to have multiple instances of the contact entry exist within each sub-list group.

21. The computer program product of claim 20, wherein displayed views of sub-list groups are determined according to the preferences of a viewer, and further, the displayed view of the sub-list groups can be configured to display multiple sub-list groups that are associated with the same primary contact list.

* * * * *